United States Patent
Nagashima et al.

(10) Patent No.: US 10,259,964 B2
(45) Date of Patent: Apr. 16, 2019

(54) AQUEOUS INK, INK CARTRIDGE AND INK JET RECORDING METHOD

(71) Applicant: CANON KABUSHIKI KAISHA, Tokyo (JP)

(72) Inventors: Sayoko Nagashima, Kawasaki (JP); Mikio Sanada, Kawasaki (JP); Shigemoto Abe, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/989,443

(22) Filed: May 25, 2018

(65) Prior Publication Data
US 2018/0346746 A1    Dec. 6, 2018

(30) Foreign Application Priority Data

Jun. 1, 2017  (JP) ................................. 2017-108897
May 17, 2018 (JP) ................................. 2018-095417

(51) Int. Cl.
| | |
|---|---|
| *C09D 11/322* | (2014.01) |
| *C09D 11/38* | (2014.01) |
| *B41J 2/175* | (2006.01) |
| *B41M 5/00* | (2006.01) |
| *C09D 11/324* | (2014.01) |

(52) U.S. Cl.
CPC ........... *C09D 11/38* (2013.01); *B41J 2/17503* (2013.01); *B41M 5/0023* (2013.01); *C09D 11/322* (2013.01); *C09D 11/324* (2013.01)

(58) Field of Classification Search
CPC ...... B41J 2/01; B41J 2/17503; B41M 5/0023; C09D 11/322; C09D 11/326; C09D 11/38; C09D 11/40; C09D 11/54; C09D 11/16
See application file for complete search history.

(56) References Cited

U.S. PATENT DOCUMENTS

| | | |
|---|---|---|
| 6,221,141 B1 | 4/2001 | Takada et al. |
| 6,280,513 B1 | 8/2001 | Osumi et al. |
| 6,332,919 B2 | 12/2001 | Osumi et al. |
| 6,375,317 B1 | 4/2002 | Osumi et al. |
| 6,425,662 B1 | 7/2002 | Teraoka et al. |
| 6,511,534 B1 | 1/2003 | Mishina et al. |

(Continued)

FOREIGN PATENT DOCUMENTS

| | | |
|---|---|---|
| EP | 3 150 677 A1 | 4/2017 |
| JP | 2000-198955 A | 7/2000 |

(Continued)

OTHER PUBLICATIONS

Oct. 22, 2018 extended European Search Report in European Patent Appln. No. 18174715.5.

*Primary Examiner* — Thinh H Nguyen
(74) *Attorney, Agent, or Firm* — Venable LLP (57) ABSTRACT

Provided is an aqueous ink that can record an image excellent in color developability and is excellent in sticking recovery property. The aqueous ink for ink jet includes: a pigment; and a surfactant, wherein the pigment includes a self-dispersible pigment in which at least one functional group selected from the group consisting of (i) an anionic group and (ii) a group in which another atomic group and an anionic group are bonded to each other is bonded to a surface of a particle of carbon black and a density of the functional group is 0.10 $\mu mol/m^2$ or more to 0.48 $\mu mol/m^2$ or less and wherein the surfactant includes an amino acid type surfactant in which a nitrogen atom capable of becoming a cation has a structure of a secondary amine or a tertiary amine.

9 Claims, 2 Drawing Sheets

(56) References Cited

U.S. PATENT DOCUMENTS

| | | |
|---|---|---|
| 6,706,105 B2 | 3/2004 | Takada et al. |
| 6,852,156 B2 | 2/2005 | Yeh et al. |
| 7,005,461 B2 | 2/2006 | Sanada et al. |
| 7,160,376 B2 | 1/2007 | Watanabe et al. |
| 7,276,112 B2 | 10/2007 | Tokuda et al. |
| 7,371,274 B2 | 5/2008 | Sanada et al. |
| 7,605,192 B2 | 10/2009 | Sanada et al. |
| 7,635,182 B2 | 12/2009 | Hakamada et al. |
| 7,682,433 B2 | 3/2010 | Yanagimachi et al. |
| 7,699,924 B2 | 4/2010 | Mafune et al. |
| 7,753,515 B2 | 7/2010 | Tokuda et al. |
| 7,862,653 B2 | 1/2011 | Sanada et al. |
| 8,007,097 B2 | 8/2011 | Sanada et al. |
| 8,016,406 B2 | 9/2011 | Hakamada et al. |
| 8,016,932 B2 | 9/2011 | Okamura et al. |
| 8,469,504 B2 | 6/2013 | Saito et al. |
| 8,672,465 B2 | 3/2014 | Sanada et al. |
| 8,857,967 B2 | 10/2014 | Saito et al. |
| 8,899,736 B2 | 12/2014 | Sanada et al. |
| 9,180,680 B2 | 11/2015 | Sanada et al. |
| 9,315,683 B2 * | 4/2016 | Nagai .................. C09D 11/32 |
| 9,371,461 B2 | 6/2016 | Saito et al. |
| 9,534,127 B2 | 1/2017 | Sanada et al. |
| 2006/0135647 A1 | 6/2006 | Ichinose et al. |
| 2015/0022585 A1 | 1/2015 | Yamashita et al. |

FOREIGN PATENT DOCUMENTS

| | | |
|---|---|---|
| JP | 2003-535949 A | 12/2003 |
| JP | 2005-187784 A | 7/2005 |
| JP | 2012-233112 A | 11/2012 |

* cited by examiner

AQUEOUS INK, INK CARTRIDGE AND INK JET RECORDING METHOD

BACKGROUND OF THE INVENTION

Field of the Invention

The present invention relates to an aqueous ink, an ink cartridge and an ink jet recording method.

Description of the Related Art

Images can be recorded on various recording media by an ink jet recording system and hence many inks, such as an ink suitable for recording a photographic image and an ink suitable for recording a business document, have been proposed. In recent years, a need for ink jet recording in a business field has been markedly growing. In particular, a detailed investigation has been made from various viewpoints, such as the composition and physical properties of an ink, so that satisfactory recording can also be performed on plain paper, such as copy paper generally used in an office.

In Japanese Patent Application Laid-Open No. 2000-198955, there is a proposal in which as long as a salt of a monovalent cation and a self-dispersible pigment are incorporated into an aqueous ink, when the aqueous ink adheres to a recording medium to advance the evaporation of its moisture, the solid-liquid separation of the ink rapidly occurs to improve the quality of an image.

Meanwhile, in Japanese Patent Application Laid-Open No. 2005-187784, in order to provide an ink that has, for example, satisfactory storage stability and satisfactory sticking resistance and that can record an image having a satisfactory color gradation property, satisfactory fixability and satisfactory water resistance, there is a proposal of an ink containing a self-dispersible pigment and a predetermined amphoteric surfactant. In addition, in Japanese Patent Application Laid-Open No. 2012-233112, in order to provide an ink that can record an image having satisfactory scratch resistance and satisfactory color uniformity, there is a proposal of an ink containing a self-dispersible pigment, a predetermined amphoteric surfactant and resin fine particles.

However, in the aqueous ink proposed in Japanese Patent Application Laid-Open No. 2000-198955, depending on the concentration of the salt, the solid-liquid separation advances even in such a site that the moisture in the ink evaporates, such as the vicinity of an ejection port of a recording head, and hence reliability, such as a sticking recovery property, reduces in some cases. The self-dispersible pigment is stably dispersed in an aqueous medium, such as water, by electrostatic repulsion based on the electric double layer of an anionic group. However, when the moisture in the ink evaporates, the concentration of the alkali metal ion (cation) increases near the pigment particles to compress the electric double layer. Accordingly, the electrostatic repulsion between the pigment particles disappears and hence the aggregation of the pigment occurs. The sticking recovery property of the ink may be reduced by the aggregation.

Meanwhile, the present inventors have made an investigation by using such ink containing the predetermined amphoteric surfactant and the self-dispersible pigment as proposed in each of Japanese Patent Application Laid-Open No. 2005-187784 and Japanese Patent Application Laid-Open No. 2012-233112 and as a result, have found that the color developability of an image does not satisfy a level required in recent years.

SUMMARY OF THE INVENTION

Therefore, an object of the present invention is to provide an aqueous ink for ink jet that can record an image excellent in color developability and is excellent in sticking recovery property. Another object of the present invention is to provide an ink cartridge and an ink jet recording method each using the ink.

The above-mentioned object is achieved by the present invention described below. That is, according to one embodiment of the present invention, there is provided an aqueous ink for ink jet including: a pigment; and a surfactant, wherein the pigment includes a self-dispersible pigment in which at least one functional group selected from the group consisting of (i) an anionic group and (ii) a group in which another atomic group and an anionic group are bonded to each other is bonded to a surface of a particle of carbon black and a density of the functional group is 0.10 $\mu mol/m^2$ or more to 0.48 $\mu mol/m^2$ or less and wherein the surfactant includes an amino acid type surfactant in which a nitrogen atom capable of becoming a cation has a structure of a secondary amine or a tertiary amine.

According to the present invention, the aqueous ink for ink jet that can record an image excellent in color developability and is excellent in sticking recovery property can be provided. According to the present invention, the ink cartridge and the ink jet recording method each using the aqueous ink can also be provided.

Further features of the present invention will become apparent from the following description of exemplary embodiments with reference to the attached drawings.

BRIEF DESCRIPTION OF THE DRAWINGS

FIG. 2A and FIG. 2B are views for schematically illustrating an example of an ink jet recording apparatus to be used in an ink jet recording method of the present invention, in which

DESCRIPTION OF THE EMBODIMENTS

Preferred embodiments of the present invention will now be described in detail in accordance with the accompanying drawings.

The present invention is described in more detail below by way of a preferred embodiment. In the present invention, when a compound is a salt, the salt is present in a state of dissociating into ions in an ink, but the expression "contains the salt" is used for convenience. In addition, an aqueous ink for ink jet is sometimes simply described as "ink". Carbon black or a self-dispersible pigment is sometimes simply described as "pigment". Physical property values are values at normal temperature (25° C.) unless otherwise stated.

First, the present inventors have paid attention to an amino acid type surfactant in which a nitrogen atom capable of becoming a cation has the structure of a secondary amine or a tertiary amine (hereinafter sometimes described as "amino acid type surfactant") as a compound whose ionicity changes depending on a pH. Here, the "amino acid type surfactant" in the present invention is described. An amino acid is a generic term for compounds each having an anionic group in a broad sense (carboxylic acid group in a narrow sense) and an amino group in a molecule thereof and the "amino acid type surfactant" refers to a surfactant (compound having a hydrophilic group and a hydrophobic group) having an amino acid moiety in a molecular structure thereof. In addition to the amino acid moiety serving as a hydrophilic portion, the amino acid type surfactant has a hydrophobic group (e.g., an alkyl chain having a somewhat large number of carbon atoms) that has hydrophilicity much lower than that of the hydrophilic portion and hence imparts surface-active performance to the compound. In addition, in the amino acid type surfactant to be used in the present invention, the nitrogen atom capable of becoming a cation (nitrogen atom having bonded thereto $R_2$ and $R_3$ in the general formula (1) to be described later) has the structure of a secondary amine or a tertiary amine.

In the amino acid type surfactant in which the nitrogen atom capable of becoming a cation has the structure of a secondary amine or a tertiary amine, as the pH reduces, the nitrogen atom becomes a cation. The nitrogen atom that has become a cation causes an ionic reaction with an anionic group of a self-dispersible pigment to generate a salt, thereby causing electrostatic repulsion by the anionic group of the self-dispersible pigment to disappear. Thus, the pigment aggregates to cause solid-liquid separation and hence an improvement in color developability by virtue of the remaining of the aggregated pigment near the surface of a recording medium can be expected.

The mechanism via which the amino acid type surfactant aggregates the pigment is similar to the destabilization of the dispersed state of a pigment due to the compression of an electric double layer by a salt of a monovalent cation, such as an alkali metal ion, and the disappearance of electrostatic repulsion subsequent thereto. However, in an alkaline range within which the pH of a typical ink containing a self-dispersible pigment having an anionic group falls, the amino acid type surfactant shows anionicity. Accordingly, even when moisture in the ink evaporates, the concentration of the cation is not increased near the pigment particles and hence the dispersed state of the pigment is not affected. Therefore, unlike the salt of the monovalent cation, when the amino acid type surfactant is used, reliability is not impaired.

The present inventors have decided to utilize the pH of a recording medium as an approach to cationizing the amino acid type surfactant through a reduction in pH of an ink. The pH of the surface of a recording medium that has been generally widely utilized, such as plain paper, falls within an acidic to neutral range. Meanwhile, the pH of an ink using a self-dispersible pigment having an anionic group as a coloring material typically falls within an alkaline range. Accordingly, when the ink is applied to the recording medium, the pH of the ink starts to reduce at the time point when the ink adheres to the recording medium.

Here, as described above, the ink containing the self-dispersible pigment and the predetermined amphoteric surfactant described in each of Japanese Patent Application Laid-Open No. 2005-187784 and Japanese Patent Application Laid-Open No. 2012-233112 has been poor in color developability of an image. The present inventors have considered a reason for the foregoing to be as described below. That is, the present inventors have considered that the poor color developability is caused as follows: the nitrogen atom of the amino acid type surfactant that has become a cation causes an ionic reaction with an anionic group of the pigment to generate a salt and the salt enters a space between the pigment particles to serve as steric hindrance, thereby rather suppressing the aggregation of the pigment. In view of the foregoing, the present inventors have suspected that mere addition of the amino acid type surfactant to the ink does not show an action enough to aggregate the pigment.

In view of the foregoing, the present inventors have conceived of the following: the hydrophobic portion (whose details are described later) of the self-dispersible pigment is caused to adsorb the amino acid type surfactant. When the hydrophobic group of the amino acid type surfactant adsorbs to the hydrophobic portion of the pigment, the steric hindrance is hardly caused. In addition, the amino acid type surfactant is present near the surfaces of the pigment particles. Accordingly, when the nitrogen atom of the amino acid type surfactant is turned into a cation by a reduction in pH of the ink, the cation and an anionic group of another self-dispersible pigment cause an ionic reaction to generate a salt. At this time, a plurality of pigment particles are brought into a state of being extremely close to each other and hence the pigment aggregates to cause the solid-liquid separation of the ink. Accordingly, an improvement in color developability by virtue of the remaining of the aggregated pigment near the surface of a recording medium can be expected.

The present inventors have searched for an ink showing such action. As a result, the present inventors have decided to use a self-dispersible pigment in which at least one functional group selected from the group consisting of (i) an anionic group and (ii) a group in which any other atomic group and an anionic group are bonded to each other is bonded to the surface of a particle of carbon black (pigment). In addition, the density of the functional group of the self-dispersible pigment determined by colloid titration needs to be 0.10 $\mu$mol/m$^2$ or more to 0.48 $\mu$mol/m$^2$ or less. The present inventors have revealed that an aqueous ink containing such self-dispersible pigment and the amino acid type surfactant provides an improving effect on the color developability of an image.

The self-dispersible pigment is a pigment of a dispersion system to be adopted when a dispersant for dispersing the pigment is not utilized by some reason. In order to stably disperse a pigment without the use of any dispersant, the density of its functional group is typically increased because electrostatic repulsion needs to be increased. In consideration of the viewpoint, the density of the functional group described above falls within a range considerably lower than that of a general self-dispersible pigment.

A portion that is not covered with any functional group (hydrophobic portion) is present on the surface of a particle of a self-dispersible pigment having a low density of the functional group as described above. The hydrophobic group of the amino acid type surfactant adsorbs to the hydrophobic portion. In other words, when the density of the functional group of the self-dispersible pigment is 0.10 $\mu$mol/m$^2$ or more to 0.48 $\mu$mol/m$^2$ or less, the hydrophobic group of the amino acid type surfactant can adsorb to the hydrophobic portion of the pigment while the dispersion stability of the pigment is kept. When the density of the functional group of the self-dispersible pigment is less than 0.10 $\mu$mol/m$^2$, the dispersion stability of the pigment cannot be kept and hence the aggregation of the pigment is liable to start before the ejection of the ink. Accordingly, the ejection becomes unstable and hence an image cannot be recorded. Meanwhile, when the density of the functional group of the self-dispersible pigment is more than 0.48 $\mu$mol/m$^2$, many functional groups including the anionic group are present on the surface of the pigment particles and hence a hydrophobic portion large enough for the hydrophobic group of the amino acid type surfactant to adsorb is not present. Accordingly, the color developability of an image is not improved.

The amino acid type surfactant to be used in the present invention is a compound in which a nitrogen atom capable of becoming a cation has the structure of a secondary amine or a tertiary amine. Examples of a surfactant in which a nitrogen atom capable of becoming a cation has the structure of a quaternary amine may include compounds having the structures of betaines and amine oxides. However, when an ink containing any such compound is used, the color developability of an image has been poor. When the surface tension of the ink using a compound having the structure of a quaternary amine is measured, it has been confirmed that the surface tension is lower than that of an ink using the amino acid type surfactant having the structure of a secondary amine or a tertiary amine and hence the compound hardly adsorbs to a pigment. In other words, it is conceivable that the compound having the structure of a quaternary amine did not adsorb to the pigment and hence did not show the above-mentioned action. In view of the foregoing, the structure of the nitrogen atom capable of becoming a cation in the amino acid type surfactant needs to be the structure of a secondary amine or a tertiary amine. A so-called general "amino acid" is also free of any hydrophobic group and is hence not included in the "amino acid type surfactant" in the present invention. The amino acid does not adsorb to any pigment and hence does not show the above-mentioned action.

Thus, the present inventors have found that when the self-dispersible pigment in which the density of the functional group falls within a specific range and the amino acid type surfactant are used, an image excellent in color developability can be recorded without the impairment of the sticking recovery property of the ink.

<Ink>

Respective components forming an aqueous ink for ink jet of the present invention are described in detail below.

(Amino Acid Type Surfactant)

An amino acid type surfactant is incorporated into the ink of the present invention. The amino acid type surfactant is a compound having, in addition to an amino acid moiety serving as a hydrophilic portion, a hydrophobic group (e.g., an alkyl chain having a somewhat large number of carbon atoms) that has hydrophilicity much lower than that of the hydrophilic portion and hence imparts surface-active performance to the compound. Of such compounds, a compound represented by the following general formula (1) is preferred as the amino acid type surfactant. When the amino acid type surfactant is of an acid type (H type), its molecular weight is preferably 220 or more to 700 or less, more preferably 250 or more to 500 or less. The content (% by mass) of the amino acid type surfactant in the ink is preferably 0.10% by mass or more to 10.00% by mass or less, more preferably 0.10% by mass or more to 5.00% by mass or less with respect to the total mass of the ink. Among them, the content is particularly preferably 0.10% by mass or more to 0.50% by mass or less.

(1)

In the general formula (1), $R_1$ represents alkyl group having 8 to 18 carbon atoms, Z represents $(CO)_p(NH(CH_2)_q)_r$ and p represents an integer of 0 or 1, q represents an integer of 2 or 3 and r represents an integer of from 1 to 3, $R_2$ represents a hydrogen atom or $(CH_2)_s$-$X_1$ and s represents an integer of from 1 to 3, $R_3$ represents $(CH_2)_t$—$X_2$ and t represents an integer of from 1 to 3 and $X_1$ and $X_2$ each independently represent a hydrogen atom, a hydroxy group, a carboxylic acid group or a sulfonic acid group, provided that $X_1$ and $X_2$ do not simultaneously represent a combination of hydrogen atoms or a combination of hydroxy groups.

$R_1$ represents an alkyl group having 8 to 18 carbon atoms. The alkyl group represented by $R_1$ may be any one of linear and branched alkyl groups, but is preferably a linear alkyl group because the group is of a compact structure and hence can easily adsorb to a pigment. Examples of the alkyl group may include: linear alkyl groups, such as an octyl group, a decyl group, an undecyl group, a dodecyl group, a hexadecyl group, a heptadecyl group and an octadecyl group; and branched alkyl groups, such as a 2-ethylhexyl group. $R_1$ more preferably represents an alkyl group having 8 to 16 carbon atoms. When $R_1$ represents an alkyl group having 8 to 16 carbon atoms, the group can more efficiently adsorb to the pigment because the group is of a compact structure despite showing surface-active performance. Thus, the amount of the compound represented by the general formula (1) that is present in a state of being liberated without adsorbing to the pigment reduces. Accordingly, the steric hindrance described in the foregoing by which the aggregation of the pigment is suppressed hardly occurs and hence the color developability of an image can be further improved.

Z represents $(CO)_p(NH(CH_2)_q)_r$ and p represents an integer of 0 or 1, q represents an integer of 2 or 3 and r represents an integer of from 1 to 3. A case in which p represents 0 means that $R_1$ in the general formula (1) is bonded to a nitrogen atom forming Z. p in the general formula (1) preferably represents 1. When p represents 1, that is, an amide group (—CONH—) is present, a hydrogen bond is formed between an oxygen atom in the amide group and a hydrogen atom forming cellulose in a recording medium. Accordingly, the compound represented by the general formula (1) can be easily present at a position closer to the surface of the recording medium and hence can aggregate the pigment at the position. Probably because of the foregoing, the color developability can be easily improved. q preferably represents 2. When r, which represents an integer of from 1 to 3, represents 0 or 4 or more, the color developability may be somewhat poor because of the following reasons. When r represents 0, a distance between $R_1$ adsorbing to the pigment and a nitrogen atom capable of becoming a cation is so short that when the nitrogen atom becomes a cation, balance between the hydrophilicity and hydrophobicity of a molecule is liable to be biased toward the hydrophilicity. Then, the compound is liable to desorb from the pigment and hence the color developability of the image is not sufficiently obtained in some cases. Meanwhile, when r represents 4 or more, a molecule of the compound represented by the general formula (1) becomes larger. Then, the nitrogen atom that has become a cation causes an ionic reaction with an anionic group of the pigment to which the atom itself adsorbs and hence hardly causes an ionic reaction with an anionic group of another self-dispersible pigment. Accordingly, the color developability of the image is not sufficiently obtained in some cases.

$R_2$ represents a hydrogen atom or $(CH_2)_s$—$X_1$ and s represents an integer of from 1 to 3. $R_3$ represents $(CH_2)_t$—$X_2$ and t represents an integer of from 1 to 3. $X_1$ and $X_2$ each independently represent a hydrogen atom, a hydroxy group, a carboxylic acid group or a sulfonic acid group, provided that $X_1$ and $X_2$ do not simultaneously represent a combination of hydrogen atoms or a combination of hydroxy groups. $R_2$ preferably represents a hydrogen atom or $(CH_2)_s$—$X_1$ where $X_1$ represents a hydroxy group or a carboxylic acid group. $R_2$ in the general formula (1) more preferably represents a hydrogen atom. In the case where $R_2$ represents a hydrogen atom, the nitrogen atom capable of becoming a cation has the structure of a secondary amine and hence shows small steric hindrance. Thus, the basicity of the molecule becomes stronger than that in the case where the nitrogen atom has the structure of a tertiary amine. Accordingly, when the ink is applied to the recording medium, the nitrogen atom that has become a cation more strongly attracts the anionic group of the pigment. Thus, the pigment can easily aggregate and hence the color developability of the image can be further improved. $X_2$ in $R_3$ more preferably represents a hydrogen atom, a hydroxy group, a carboxylic acid group or a sulfonic acid group and still more preferably represents a carboxylic acid group. s and t each independently represent an integer of from 1 to 3. When s or t represents 4 or more, a distance between the nitrogen atom capable of becoming a cation and $X_1$ or $X_2$ becomes so long that the atom and $X_1$ or $X_2$ are liable to cause an ionic reaction in a molecule in some cases. Then, the atom hardly causes an ionic reaction with an anionic group of another self-dispersible pigment and hence the color developability of the image is not sufficiently obtained in some cases.

The compound represented by the general formula (1) is an "amino acid type" surfactant and hence an anionic group needs to be present therein. Therefore, the terminal of at least one of $R_2$ and $R_3$ is an anionic group. Accordingly, $X_1$ and $X_2$ do not simultaneously represent a combination of hydrogen atoms or a combination of hydroxy groups. More specifically, the combination of $X_1$ and $X_2$ is not a combination of hydrogen atoms, a combination of hydroxy groups, or a combination of a hydrogen atom corresponding to one of $X_1$ and $X_2$ and a hydroxy group corresponding to the other thereof. A carboxylic acid group and a sulfonic acid group in $X_1$ and $X_2$ may each be of an acid type (H type) or may each be of a salt type. When the carboxylic acid group or the like is a salt type (when the carboxylic acid group or the like forms a salt), its counter ion may be, for example, a cation of an alkali metal, ammonium or an organic ammonium. Examples of the alkali metal may include lithium, sodium and potassium. Examples of the organic ammonium may include: mono-, di- or tri-alkylamines each having 1 or more to 3 or less carbon atoms, such as methylamine, ethylamine, diethylamine and triethylamine; and mono-, di- or tri-alkanolamines each having 1 or more to 4 or less carbon atoms, such as monoethanolamine, diethanolamine, triethanolamine, monoisopropanolamine, diisopropanolamine and triisopropanolamine.

Suitable examples of the amino acid type surfactant each shown as an acid type (H type) may include compounds 1 to 25 shown in Table 1. Of course, a compound to be used in the present invention is not limited to the following compounds as long as the compound is included in the definition of the "amino acid type surfactant" described in the foregoing, suitably the structure of the general formula (1) and the definition thereof. In addition, the amino acid type surfactants may be used alone or in combination thereof.

TABLE 1

Specific examples of amino acid type surfactant

| | $R_1$ | Z | $R_2$ | $R_3$ | Remark |
|---|---|---|---|---|---|
| Compound 1 | $C_{11}H_{23}$ | CO—(NH(CH$_2$)$_2$)$_2$ | H | CH$_2$COOH | General formula (1) |
| Compound 2 | $C_{12}H_{25}$ | (NH(CH$_2$)$_2$)$_2$ | H | CH$_2$COOH | General formula (1) |
| Compound 3 | $C_7H_{15}$ | (NH(CH$_2$)$_2$)$_2$ | H | CH$_2$COOH | — |
| Compound 4 | $C_8H_{17}$ | (NH(CH$_2$)$_2$)$_2$ | H | CH$_2$COOH | General formula (1) |
| Compound 5 | $C_{18}H_{37}$ | (NH(CH$_2$)$_2$)$_2$ | H | CH$_2$COOH | General formula (1) |
| Compound 6 | $C_{19}H_{39}$ | (NH(CH$_2$)$_2$)$_2$ | H | CH$_2$COOH | — |
| Compound 7 | $C_{11}H_{23}$ | (NHCH$_2$)$_2$ | H | CH$_2$COOH | — |
| Compound 8 | $C_{12}H_{25}$ | (NH(CH$_2$)$_3$)$_2$ | H | CH$_2$COOH | General formula (1) |
| Compound 9 | $C_{12}H_{25}$ | (NH(CH$_2$)$_4$)$_2$ | H | CH$_2$COOH | — |
| Compound 10 | $C_{12}H_{25}$ | — | H | CH$_2$COOH | — |
| Compound 11 | $C_{12}H_{25}$ | NH(CH$_2$)$_2$ | H | CH$_2$COOH | General formula (1) |
| Compound 12 | $C_{12}H_{25}$ | (NH(CH$_2$)$_2$)$_3$ | H | CH$_2$COOH | General formula (1) |
| Compound 13 | $C_{12}H_{25}$ | (NH(CH$_2$)$_2$)$_4$ | H | CH$_2$COOH | — |
| Compound 14 | $C_{11}H_{23}$ | CO—NH(CH$_2$)$_2$ | (CH$_2$)$_2$OH | CH$_2$COOH | General formula (1) |
| Compound 15 | $C_{11}H_{23}$ | CO—NH(CH$_2$)$_2$ | (CH$_2$)$_2$COOH | CH$_2$COOH | General formula (1) |
| Compound 16 | $C_{11}H_{23}$ | CO—NH(CH$_2$)$_2$ | (CH$_2$)$_4$OH | CH$_2$COOH | — |
| Compound 17 | $C_{12}H_{25}$ | (NH(CH$_2$)$_2$)$_2$ | H | (CH$_2$)$_3$COOH | General formula (1) |
| Compound 18 | $C_{12}H_{25}$ | (NH(CH$_2$)$_2$)$_2$ | H | (CH$_2$)$_4$COOH | — |
| Compound 19 | $C_{12}H_{25}$ | (NH(CH$_2$)$_2$)$_2$ | H | CH$_2$SO$_3$H | General formula (1) |
| Compound 20 | $C_{17}H_{36}$ | CO—NH(CH$_2$)$_2$ | (CH$_2$)$_2$COOH | (CH$_2$)$_2$COOH | General formula (1) |
| Compound 21 | $C_{11}H_{23}$ | CO—NH(CH$_2$)$_2$ | (CH$_2$)$_2$OCOOH | CH$_2$COOH | — |
| Compound 22 | $C_{12}H_{25}$ | — | CH$_2$OH | CH$_2$COOH | — |
| Compound 23 | $C_{11}H_{23}$ | CO | CH$_3$ | CH$_2$COOH | — |
| Compound 24 | $C_{11}H_{23}$ | CO | CH$_3$ | (CH$_2$)$_2$COOH | — |
| Compound 25 | $C_{12}H_{25}$ | — | CH$_3$ | CH$_2$CH(OH)CH$_2$SO$_3$H | — |

(Self-Dispersible Pigment)

A self-dispersible pigment in which at least one functional group selected from the group consisting of (i) an anionic group and (ii) a group in which any other atomic group and an anionic group are bonded to each other is bonded to a surface of a particle of carbon black is incorporated into the ink of the present invention. Further, the density of the functional group needs to be 0.10 μmol/m$^2$ or more to 0.48 μmol/m$^2$ or less. The content (% by mass) of the self-dispersible pigment in the ink is preferably 0.50% by mass or more to 10.00% by mass or less, more preferably 1.00% by mass or more to 10.00% by mass or less with respect to the total mass of the ink.

The use of the self-dispersible pigment as a coloring material can eliminate the need for the addition of a dispersant for dispersing the pigment in the ink or reduce the addition amount of the dispersant to the extent possible. In the present invention, there is no need to use a dispersant, such as a resin or a surfactant, for dispersing the self-dispersible pigment or to use the self-dispersible pigment included in a resin.

A pigment in which at least one functional group selected from the group consisting of (i) the anionic group and (ii) the group in which the other atomic group and an anionic group are bonded to each other is bonded to the surface of a particle of carbon black (pigment) is used as the self-dispersible pigment. That is, a self-dispersible pigment in which the anionic group is bonded to the surface of the pigment particle directly or through the other atomic group (—R—) is used. Examples of the anionic group may include a carboxylic acid group (—COOM), a sulfonic acid group (—SO$_3$M) and a phosphonic acid group (—PO$_3$M$_2$). M's each independently represent a hydrogen atom, an alkali metal, ammonium or an organic ammonium. Examples of the alkali metal and the organic ammonium may include the same examples as those listed in the description of the amino acid type surfactant. Examples of the other atomic group (—R—) may include an alkylene group, an arylene group, an amide group, a sulfonyl group, an imino group, a carbonyl group, an ester group, an ether group and a group obtained by combining those groups.

Carbon black serving as an inorganic pigment is used as a pigment species forming the self-dispersible pigment. In addition to the carbon black, an organic pigment, a dye or the like may be further incorporated into the ink for the purpose of, for example, toning its color. As compared to the organic pigments, such as azo, phthalocyanine and quinacridone, the carbon black has a significantly large specific surface area and high hydrophobicity. Therefore, in the case of the carbon black, a lower limit for the density of the functional group for keeping the dispersion stability of the pigment needs to be set to a value higher than those in the cases of the organic pigments. Meanwhile, as compared to the organic pigments, the carbon black has high hydrophobicity and hence the hydrophobic group of the amino acid type surfactant adsorbs to a hydrophobic portion on the surface of a particle of carbon black by virtue of a hydrophobic interaction. Accordingly, the color developability of the image can be improved. In each of the cases of the organic pigments, hydrophobicity is low and hence strong adsorption by virtue of the hydrophobic interaction described in the foregoing does not occur. Accordingly, the color developability of the image cannot be improved.

In order to obtain the effects of the present invention, the density of the functional group of the self-dispersible pigment to be incorporated into the ink, the density being determined by colloid titration, needs to be 0.10 µmol/m$^2$ or more to 0.48 µmol/m$^2$ or less. A self-dispersible pigment in which the density of the functional group is 0.30 µmol/m$^2$ or less is preferred. When a self-dispersible pigment in which the density of the functional group is 0.10 µmol/m$^2$ or more to 0.30 µmol/m$^2$ or less is used, the amino acid type surfactant more efficiently adsorbs to the self-dispersible pigment and hence the color developability of the image can be further improved.

The density of the functional group is represented by the number of micromoles of the functional group per unit area of the pigment. The density of the functional group of the self-dispersible pigment can be measured as described below. First, the surface charge quantity of the self-dispersible pigment is measured by colloid titration. In addition, whether the functional group of the self-dispersible pigment is an anionic group or a group in which any other atomic group and an anionic group are bonded to each other is analyzed by NMR or the like and in the latter case, the number n of the anionic groups in one functional group is determined. In the case where the functional group of the self-dispersible pigment is an anionic group, the surface charge quantity is used as it is as the density of the functional group. In the case where the functional group is a group in which any other atomic group and an anionic group are bonded to each other, a value obtained by dividing the surface charge quantity by the number n of the anionic groups in one functional group is the density of the functional group. In the pH region of an aqueous ink to be generally used, the dissociation number of a phosphonic acid group is "1".

In addition, the anionic group in the self-dispersible pigment is preferably a carboxylic acid group from the viewpoint that the effects of the present invention are further improved. This is probably because of the following reason. A carboxylic acid has an acid dissociation constant higher than those of other acids, such as a sulfonic acid, and is hence hardly present as an ion as compared to the other acids under the same pH condition. Accordingly, the carboxylic acid has high reactivity with the nitrogen atom of the amino acid type surfactant capable of becoming a cation. Further, the functional group in the self-dispersible pigment is preferably a group in which two or more carboxylic acid groups are bonded to any other atomic group because the effects are further improved. Such functional group has two or more carboxylic acid groups and hence the density of the functional group reduces as compared to that in the case of a carboxylic acid group even at the same anionic group density. Thus, a larger number of hydrophobic portions of the pigment are present and hence the amino acid type surfactant can easily adsorb thereto.

(Aqueous Medium)

The ink of the present invention is an aqueous ink containing at least water as an aqueous medium. The water or an aqueous medium that is a mixed solvent of the water and a water-soluble organic solvent can be used in the ink of the present invention. Deionized water (ion-exchanged water) is preferably used as the water. The content (% by mass) of the water in the ink is preferably 10.00% by mass or more to 90.00% by mass or less, more preferably 50.00% by mass or more to 90.00% by mass or less with respect to the total mass of the ink.

The water-soluble organic solvent is not particularly limited as long as the solvent is water-soluble and, for example, an alcohol, a polyhydric alcohol, a (poly)alkylene glycol, a glycol ether, a nitrogen-containing polar solvent or a sulfur-containing polar solvent can be used. The content (% by mass) of the water-soluble organic solvent in the ink is preferably 3.00% by mass or more to 50.00% by mass or less with respect to the total mass of the ink.

(Other Additives)

The ink of the present invention may contain a water-soluble organic compound that is solid at normal temperature, such as polyhydric alcohols, such as trimethylolpropane or trimethylolethane, or urea derivatives, such as urea or ethylene urea, as required in addition to the above-mentioned components. Further, the ink of the present invention may contain any one of various additives, such as a surfactant, a pH adjuster, a rust inhibitor, an antiseptic, an antifungal agent, an antioxidant, an anti-reducing agent, an evaporation accelerator, a chelating agent and a resin, as required, provided that it is preferred that a salt of a monovalent cation be not used or even when the salt is used, its amount be set to an extremely small amount (about 0.05% by mass or less in terms of a content). In addition, in the case where the resin is used, a water-soluble resin is preferred and it is preferred that a water-dispersible resin (resin particles) be not used or even when the water-dispersible resin is used, its amount be set to an extremely small amount (about 0.05% by mass or less in terms of a content).

(Physical Properties of Ink)

In the present invention, the pH, static surface tension and viscosity of the ink at 25° C. preferably fall within the following ranges. The pH is preferably 7.5 or more to 10.0 or less, more preferably 7.5 or more to 9.5 or less. The static surface tension is preferably 30 mN/m or more to 45 mN/m or less, more preferably 35 mN/m or more to 40 mN/m or less. In addition, the viscosity is preferably 1.0 mPa·s or more to 5.0 mPa·s or less.

<Ink Cartridge>

Figure 1:
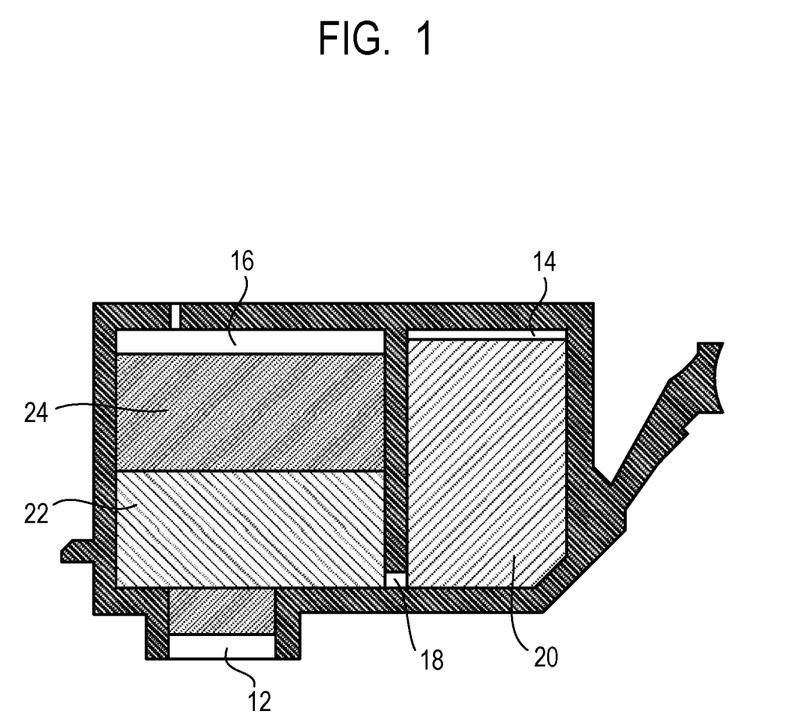
FIG. 1 is a sectional view for schematically illustrating one embodiment of an ink cartridge of the present invention.

An ink cartridge of the present invention includes an ink and an ink storage portion configured to store the ink. In addition, the ink stored in the ink storage portion is the ink of the present invention described above. FIG. 1 is a sectional view for schematically illustrating one embodiment of the ink cartridge of the present invention. As illustrated in FIG. 1, an ink supply port 12 for supplying an ink 20 to a recording head is arranged on the bottom surface of the ink cartridge. The inside of the ink cartridge is the ink storage portion for storing the ink 20. The ink storage portion includes an ink storage chamber 14 and an absorber storage chamber 16 and the chambers communicate to each other through a communication port 18. In addition, the absorber storage chamber 16 communicates to the ink supply port 12. While the liquid ink 20 is stored in the ink storage chamber 14, an absorber 22 and an absorber 24 each configured to hold the ink in a state of being impregnated therewith are stored in the absorber storage chamber 16. The ink storage portion may be of a form that is free of the ink storage chamber 14 configured to store the liquid ink and is configured to hold the total amount of the ink to be stored with the absorbers. In addition, the ink storage portion may be of a form that is free of any absorber and is configured to store the total amount of the ink in a liquid state. Further, an ink cartridge of a form formed to include the ink storage portion and the recording head may be adopted.

<Ink Jet Recording Method>

An ink jet recording method of the present invention is a method including ejecting the ink of the present invention described above from a recording head of an ink jet system to record an image on a recording medium. A system of ejecting the ink is, for example, a system involving applying mechanical energy to the ink or a system involving applying thermal energy to the ink. In the present invention, the system involving applying the thermal energy to the ink to eject the ink is particularly preferably adopted. The step of the ink jet recording method only needs to be a known step except that the ink of the present invention is used.

Figure 2A:
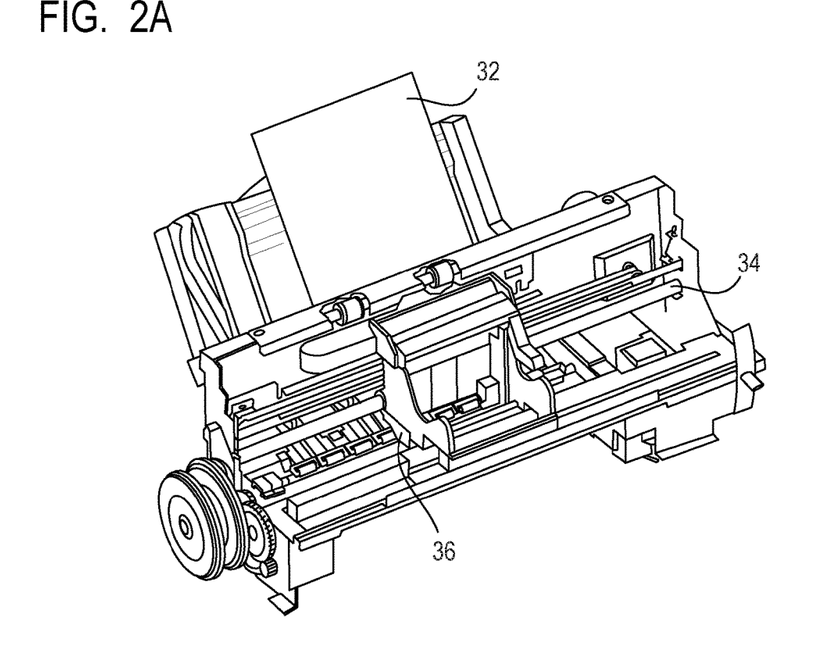
FIG. 2A is a perspective view of the main portion of the ink jet recording apparatus and FIG. 2B is a perspective view of a head cartridge.
Figure 2B:
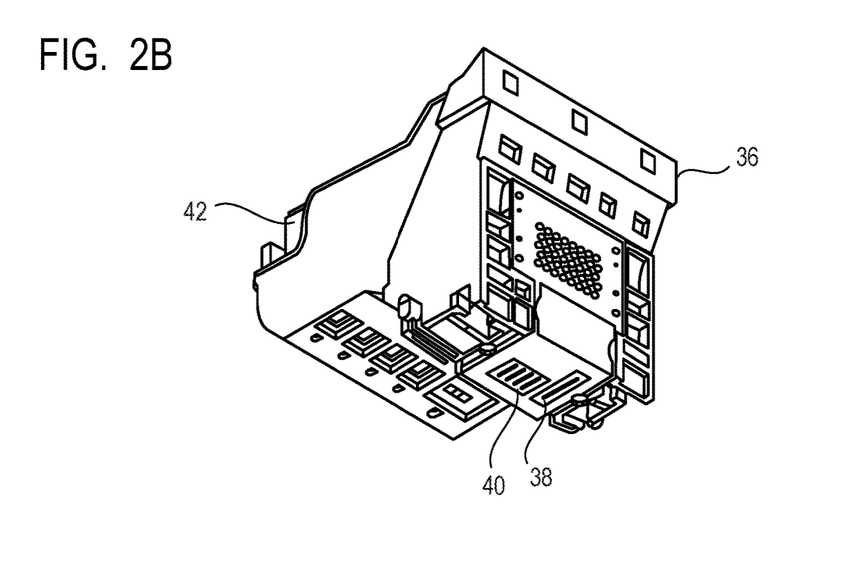

FIG. 2A and FIG. 2B are views for schematically illustrating an example of an ink jet recording apparatus to be used in the ink jet recording method of the present invention, in which FIG. 2A is a perspective view of the main portion of the ink jet recording apparatus and FIG. 2B is a perspective view of a head cartridge 36. A conveying unit (not shown) configured to convey a recording medium 32 and a carriage shaft 34 are arranged in the ink jet recording apparatus. The head cartridge 36 can be mounted on the carriage shaft 34. The head cartridge 36 includes recording heads 38 and 40 and is formed so that an ink cartridge 42 may be set therein. While the head cartridge 36 is conveyed along the carriage shaft 34 in a main scanning direction, the ink (not shown) is ejected from the recording heads 38 and 40 toward the recording medium 32. Then, the recording medium 32 is conveyed by the conveying unit (not shown) in a sub-scanning direction. Thus, the image is recorded on the recording medium 32.

Although any recording medium may be used as the recording medium on which the image is to be recorded with the ink of the present invention, paper having permeability, such as a recording medium free of any coating layer (plain paper) or a recording medium having a coat layer (glossy paper or art paper), is preferably used. The recording medium free of any coating layer, such as plain paper, is particularly preferably used. The pH of the surface of general plain paper falls within an acidic to neutral range. Specifically, the pH falls within the range of from 5.0 or more to 7.3 or less.

EXAMPLES

The present invention is described in more detail below by way of Examples and Comparative Examples. However, the present invention is by no means limited to Examples below without departing from the gist of the present invention. In the description of the amounts of components, "part(s)" and "%" are by mass unless otherwise specified.

<Preparation of Pigment Dispersion Liquid>

(Pigment Dispersion Liquid 1)

0.42 Gram of 4-aminophthalic acid was added in a state of being cooled to a temperature of 5° C. to a solution obtained by dissolving 1.5 g of concentrated hydrochloric acid in 5.5 g of water. Next, a container containing the solution was loaded into an ice bath and the solution was stirred to establish a state in which the temperature of the solution was always kept at 10° C. or less, followed by the addition of a solution obtained by dissolving 0.5 g of sodium nitrite in 9.0 g of water at 5° C. to the solution. After the solution had been further stirred for 15 minutes, 6.0 g of carbon black having a specific surface area of 220 $m^2/g$ and a DBP oil absorption of 105 mL/100 g was added to the solution under stirring. After that, the mixture was further stirred for 15 minutes to provide a slurry. After the resultant slurry had been filtered with filter paper (product name: "STANDARD FILTER PAPER No. 2," manufactured by Advantec), pigment particles were sufficiently washed with water and dried in an oven at a temperature of 110° C. to prepare a self-dispersible pigment. The concentration of a pigment solid content was adjusted and thus a pigment dispersion liquid 1 was obtained. The pigment dispersion liquid 1 contained such self-dispersible pigment that a phthalic acid group whose counter ion was sodium was bonded to the surface of the pigment particle and the content of the pigment was 10.0%.

(Pigment Dispersion Liquids 2 to 5 and 16 to 18)

Pigment dispersion liquids 2 to 5 and 16 to 18 were each obtained in the same manner as in the preparation of the pigment dispersion liquid 1 except that the usage amounts of concentrated hydrochloric acid, 4-aminophthalic acid and sodium nitrite were changed. Each of the pigment dispersion liquids 2 to 5 and 16 to 18 contained such self-dispersible pigment that a phthalic acid group whose counter ion was sodium was bonded to the surface of the pigment particle and the content of the pigment was 10.0%.

(Pigment Dispersion Liquid 6)

A container containing a mixture of 20.0 g of carbon black having a specific surface area of 220 $m^2/g$ and a DBP oil absorption of 105 mL/100 g and 4.0 g of sulfanilic acid was loaded into a water bath at 70° C. A solution obtained by dissolving 1.68 g of sodium nitrite in 74.32 g of distilled water was added to the container under stirring. Hydrochloric acid was added to adjust the pH of the liquid to 2. After that, the mixture was stirred with a magnetic stirrer at 70° C. for 1 hour to provide a slurry. After the resultant slurry had been filtered with filter paper (product name: "STANDARD FILTER PAPER No. 2," manufactured by Advantec), pigment particles were sufficiently washed with water and dried in an oven at a temperature of 110° C. to prepare a self-dispersible pigment. The concentration of a pigment solid content was adjusted and thus a pigment dispersion liquid 6 was obtained. The pigment dispersion liquid 6 contained such self-dispersible pigment that a benzenesulfonic acid group whose counter ion was sodium was bonded to the surface of the pigment particle and the content of the pigment was 10.0%.

(Pigment Dispersion Liquid 7)

Carbon black having a specific surface area of 220 $m^2/g$ and a DBP oil absorption of 105 mL/100 g was used. 40.0 Grams of the carbon black, 7.0 mmol of a monosodium salt of ((4-aminobenzoylamino)-methane-1,1-diyl)bisphosphonic acid, 20.0 mmol of nitric acid and 200.0 mL of pure water were mixed. Then, the materials were mixed with a Silverson mixer at room temperature and 6,000 rpm. 30 Minutes after that, 20.0 mmol of sodium nitrite dissolved in a small amount of water was slowly added to the mixture. The temperature of the mixture reached 60° C. as a result of the mixing and the mixture was subjected to a reaction in the state for 1 hour. After that, an aqueous solution of sodium hydroxide was used to adjust the pH of the mixture to 10. 30 Minutes after that, 20.0 mL of pure water was added to mixture and the whole was subjected to diafiltration with a spectrum membrane. The concentration of a pigment solid content was adjusted and thus a pigment dispersion liquid 7 was obtained. The pigment dispersion liquid 7 contained such self-dispersible pigment that a ((4-benzoylamino)-methane-1,1-diyl)bisphosphonic acid group whose counter ion was sodium was bonded to the surface of the pigment particle and the content of the pigment was 10.0%.

(Pigment Dispersion Liquid 8)

1.55 Grams of p-aminobenzoic acid was added in a state of being cooled to a temperature of 5° C. to a solution obtained by dissolving 5.0 g of concentrated hydrochloric acid in 5.5 g of water. Next, a container containing the solution was loaded into an ice bath and the solution was stirred to establish a state in which the temperature of the solution was always kept at 10° C. or less, followed by the addition of a solution obtained by dissolving 1.8 g of sodium nitrite in 9.0 g of water at 5° C. to the solution. After the solution had been further stirred for 15 minutes, 4.8 g of carbon black having a specific surface area of 220 $m^2/g$ and a DBP oil absorption of 105 mL/100 g was added to the solution under stirring. After that, the mixture was further stirred for 15 minutes to provide a slurry. After the resultant slurry had been filtered with filter paper (product name: "STANDARD FILTER PAPER No. 2," manufactured by Advantec), pigment particles were sufficiently washed with water and dried in an oven at a temperature of 110° C. to prepare a self-dispersible pigment. The concentration of a pigment solid content was adjusted and thus a pigment dispersion liquid 8 was obtained. The pigment dispersion liquid 8 contained such self-dispersible pigment that a benzoic acid group whose counter ion was sodium was bonded to the surface of the pigment particle and the content of the pigment was 10.0%.

(Pigment Dispersion Liquid 9)

A pigment dispersion liquid 9 was obtained in the same manner as in the preparation of the pigment dispersion liquid 6 except that the amounts of sulfanilic acid and sodium nitrite were adjusted to appropriate amounts. The pigment dispersion liquid 9 contained such self-dispersible pigment that a benzenesulfonic acid group whose counter ion was sodium was bonded to the surface of the pigment particle and the content of the pigment was 10.0%.

(Pigment Dispersion Liquid 10)

10.0 Parts of carbon black having a specific surface area of 220 $m^2/g$ and a DBP oil absorption of 105 mL/100 g, 20.0 parts of a liquid containing a resin and 70.0 parts of ion-exchanged water were mixed to provide a mixture. A liquid obtained by neutralizing a styrene-acrylic acid copolymer with an equimolar amount of an aqueous solution of sodium hydroxide with respect to the acid value of the copolymer, the liquid having a resin content of 20.0%, was used as the liquid containing the resin. The styrene-acrylic acid copolymer has an acid value of 140 mgKOH/g and a weight-average molecular weight of 10,000. After the resultant mixture had been dispersed with a batch type vertical sand mill (manufactured by Aimex Co., Ltd.) for 3 hours, the dispersed product was filtered with a microfilter having a pore size of 1.2 μm (manufactured by Fujifilm Corporation) under pressure. Next, ion-exchanged water was added to the filtrate to provide a pigment dispersion liquid 10 having a pigment content of 10.0% and a resin content of 4.0%.

(Pigment Dispersion Liquid 11)

1.69 Grams of silver nitrate was added to a solution, which had been obtained by dissolving 3.08 g of $H_3N^+C_6H_4N^+(CH_3)_3Cl^-.I^-$ in 30.0 g of water, under stirring. A produced precipitate was removed by filtration and the filtrate was fractionated. The filtrate obtained in the foregoing was added to a liquid, which had been obtained by suspending 40.0 g of carbon black having a specific surface area of 220 $m^2/g$ and a DBP oil absorption of 105 mL/100 g in 70.0 g of water, under stirring. After 2.25 g of concentrated nitric acid had been further added to the mixture, a solution obtained by dissolving 0.83 g of sodium nitrite in 10.0 g of water was added to the mixture. When the occurrence of bubbles stopped, the mixture was dried in an oven at a temperature of 120° C. to prepare a self-dispersible pigment. The concentration of a pigment solid content was adjusted and thus a pigment dispersion liquid 11 was obtained. The pigment dispersion liquid 11 contained such self-dispersible pigment that a $C_6H_4N^+(CH_3)_3$ group was bonded to the surface of the pigment particle and the content of the pigment was 10.0%.

(Pigment Dispersion Liquid 12)

A pigment dispersion liquid 12 was obtained by adding an appropriate amount of water to a commercial pigment dispersion liquid containing a self-dispersible pigment (product name: "CAB-O-JET 270Y," manufactured by Cabot Corporation). The pigment dispersion liquid 12 contained such self-dispersible pigment that a benzenesulfonic acid group was bonded to the surface of the particle of C.I. Pigment Yellow 74 and the content of the pigment was 10.0%.

(Pigment Dispersion Liquid 13)

A pigment dispersion liquid 13 was obtained by adding an appropriate amount of water to a commercial pigment dispersion liquid containing a self-dispersible pigment (product name: "CAB-O-JET 260M," manufactured by Cabot Corporation). The pigment dispersion liquid 13 contained such self-dispersible pigment that a benzenesulfonic acid group was bonded to the surface of the particle of C.I. Pigment Red 122 and the content of the pigment was 10.0%.

(Pigment Dispersion Liquid 14)

A pigment dispersion liquid 14 was obtained by adding an appropriate amount of water to a commercial pigment dispersion liquid containing a self-dispersible pigment (product name: "CAB-O-JET 265M," manufactured by Cabot Corporation). The pigment dispersion liquid 14 contained such self-dispersible pigment that a benzenesulfonic acid group was bonded to the surface of the particle of C.I. Pigment Red 122 and the content of the pigment was 10.0%.

(Pigment Dispersion Liquid 15)

A pigment dispersion liquid 15 was obtained by adding an appropriate amount of water to a commercial pigment dispersion liquid containing a self-dispersible pigment (product name: "CAB-O-JET 250C," manufactured by Cabot Corporation). The pigment dispersion liquid 15 contained such self-dispersible pigment that a benzenesulfonic acid group was bonded to the surface of the particle of C.I. Pigment Blue 15:3 and the content of the pigment was 10.0%.

(Pigment Dispersion Liquid 19)

A pigment dispersion liquid 19 was obtained by adding an appropriate amount of water to a commercial pigment dispersion liquid containing a self-dispersible pigment (product name: "CAB-O-JET 200," manufactured by Cabot Corporation). The pigment dispersion liquid 19 contained such self-dispersible pigment that a benzenesulfonic acid group was bonded to the surface of the particle of carbon black and the content of the pigment was 10.0%.

(Pigment Dispersion Liquid 20)

A pigment dispersion liquid 20 was obtained by adding an appropriate amount of water to a commercial pigment dispersion liquid containing a self-dispersible pigment (product name: "CAB-O-JET 300," manufactured by Cabot Corporation). The pigment dispersion liquid 20 contained such self-dispersible pigment that a benzoic acid group was bonded to the surface of the particle of carbon black and the content of the pigment was 10.0%.

(Pigment Dispersion Liquid 21)

A self-dispersible pigment was prepared by subjecting the surface of a pigment particle to an oxidation treatment with an ozone gas with reference to the description of Example 3 of Japanese Patent Application Laid-Open No. 2003-535949. Specifically, first, the pigment was preliminarily dispersed in ion-exchanged water and then subjected to an ozone treatment for 6 hours. Carbon black having a specific surface area of 220 $m^2/g$ and a DBP oil absorption of 105 mL/100 g was used as the pigment. Next, while potassium hydroxide was added to adjust the pH of the mixture to about 7, the mixed materials were circulated and mixed with a liquid-liquid collision type dispersing machine for 3 hours. After that, the mixture was purified by ultrafiltration and an appropriate amount of potassium hydroxide was added to adjust the pH of the purified product to 10, followed by the adjustment of the concentration of a pigment solid content. Thus, a pigment dispersion liquid 21 was obtained. The pigment dispersion liquid 21 contained such self-dispersible pigment that a carboxylic acid group whose counter ion was potassium was bonded to the surface of the pigment particle and the content of the pigment was 10.0%.

(Pigment Dispersion Liquid 22)

A pigment dispersion liquid 22 was obtained in the same manner as in the preparation of the pigment dispersion liquid 21 except that the time of the ozone treatment was changed to 1.5 hours. The pigment dispersion liquid 22 contained such self-dispersible pigment that a carboxylic acid group whose counter ion was potassium was bonded to the surface of the pigment particle and the content of the pigment was 10.0%.

(Density of Functional Group)

With regard to each of the pigment dispersion liquids 1 to 9 and 11 to 22 each containing a self-dispersible pigment, the density of the functional group of the self-dispersible pigment in the pigment dispersion liquid was measured by colloid titration. Specifically, the amount of an ionic group in each of the pigment dispersion liquids was measured with a potentiometric automatic titration apparatus (product name: "AT-510," manufactured by Kyoto Electronics Manufacturing Co., Ltd.) mounted with a flow potentiometric titration unit (PCD-500) by potentiometric titration. Then, a functional group density was calculated by dividing the measured amount by the number of the ionic groups in one functional group. When the ionic group was an anionic group, a methyl glycol chitosan was used as a titration reagent. When the ionic group was a cationic group, potassium polyvinyl sulfate was used as the reagent. The results are shown in Table 2. Although the pigment dispersion liquid 10 is not a pigment dispersion liquid containing a self-dispersible pigment, its pigment species is shown in Table 2 for reference.

TABLE 2

| | | Characteristics of pigments | | |
|---|---|---|---|---|
| Pigment dispersion liquid | Dispersion system | Pigment species | Functional group | Functional group density ($\mu mol/m^2$) |
| 1 | Self-dispersible | Carbon black | Phthalic acid group | 0.26 |
| 2 | Self-dispersible | Carbon black | Phthalic acid group | 0.10 |
| 3 | Self-dispersible | Carbon black | Phthalic acid group | 0.48 |
| 4 | Self-dispersible | Carbon black | Phthalic acid group | 0.30 |
| 5 | Self-dispersible | Carbon black | Phthalic acid group | 0.31 |
| 6 | Self-dispersible | Carbon black | Benzenesulfonic acid group | 0.26 |
| 7 | Self-dispersible | Carbon black | (*1) | 0.26 |
| 8 | Self-dispersible | Carbon black | Benzoic acid group | 0.26 |
| 9 | Self-dispersible | Carbon black | Benzenesulfonic acid group | 0.31 |
| 10 | Resin-dispersed | Carbon black | | |
| 11 | Self-dispersible | Carbon black | —$C_6H_4N^+(CH_3)_3$ group | 0.31 |
| 12 | Self-dispersible | C.I. Pigment Yellow 74 | Benzenesulfonic acid group | 2.01 |
| 13 | Self-dispersible | C.I. Pigment Red 122 | Benzenesulfonic acid group | 1.17 |
| 14 | Self-dispersible | C.I. Pigment Red 122 | Benzenesulfonic acid group | 1.09 |
| 15 | Self-dispersible | C.I. Pigment Blue 15:3 | Benzenesulfonic acid group | 2.17 |

TABLE 2-continued

<table>
<tr><th colspan="5">Characteristics of pigments</th></tr>
<tr><th>Pigment dispersion liquid</th><th>Dispersion system</th><th>Pigment species</th><th>Functional group</th><th>Functional group density (μmol/m²)</th></tr>
<tr><td>16</td><td>Self-dispersible</td><td>Carbon black</td><td>Phthalic acid group</td><td>0.09</td></tr>
<tr><td>17</td><td>Self-dispersible</td><td>Carbon black</td><td>Phthalic acid group</td><td>0.49</td></tr>
<tr><td>18</td><td>Self-dispersible</td><td>Carbon black</td><td>Phthalic acid group</td><td>0.92</td></tr>
<tr><td>19</td><td>Self-dispersible</td><td>Carbon black</td><td>Benzenesulfonic acid group</td><td>0.92</td></tr>
<tr><td>20</td><td>Self-dispersible</td><td>Carbon black</td><td>Benzoic acid group</td><td>0.74</td></tr>
<tr><td>21</td><td>Self-dispersible</td><td>Carbon black</td><td>Carboxylic acid group</td><td>0.50</td></tr>
<tr><td>22</td><td>Self-dispersible</td><td>Carbon black</td><td>Carboxylic acid group</td><td>1.23</td></tr>
</table>

(*1) ((4-Benzoylamino)-methane-1,1-diyl)bisphosphonic acid group

<Preparation of Amino Acid Type Surfactant>

Compounds obtained by turning the compounds 1 to 19 shown in Table 1 into sodium salt types were used in the preparation of inks. In addition, sodium salts of the following comparative compounds 1 and 2, and the following comparative compound 3 were used in the inks of Comparative Examples. None of the comparative compounds 1 to 3 is an amino acid type surfactant.

Comparative Compound 1 (Bicine)

$HOC_2H_4-N((CH_2)_2OH)-CH_2COOH$

Comparative Compound 2 (Lauramidopropyl Betaine)

$C_{11}H_{23}-CO-NH(CH_2)_3-N^+(CH_3)_2-CH_2COOH$

Comparative Compound 3 (Lauramidopropyl Dimethylamine Oxide)

$C_{11}H_{23}-CO-NH(CH_2)_3-N^+(CH_3)_2-O^-$

<Preparation of Inks>

Respective components (unit: %) shown in the lower column of Table 3 were mixed and sufficiently stirred. After that, the mixture was filtered with a microfilter having a pore size of 3.0 μm (manufactured by Fujifilm Corporation) under pressure to prepare each ink. The term "PEG600" in Table 3 refers to a polyethylene glycol having a number-average molecular weight of 600. In addition, the term "ACETYLENOL E100" refers to a nonionic surfactant (ethylene oxide adduct of acetylene glycol) manufactured by Kawaken Fine Chemicals Co., Ltd. When the pH of each of the prepared inks was measured with a pH meter (F-21; manufactured by Horiba, Ltd.), the pH fell within the range of from 7.5 or more to 9.5 or less. A dispersed liquid containing resin fine particles 1 is an aqueous dispersed liquid containing 45.0% of resin fine particles each formed of an acrylic resin, the aqueous dispersed liquid having been prepared in conformity with the description of Japanese Patent Application Laid-Open No. 2012-233112.

TABLE 3

<table>
<tr><th colspan="15">Compositions and characteristics of inks</th></tr>
<tr><th></th><th colspan="14">Example</th></tr>
<tr><th></th><th>1</th><th>2</th><th>3</th><th>4</th><th>5</th><th>6</th><th>7</th><th>8</th><th>9</th><th>10</th><th>11</th><th>12</th><th>13</th><th>14</th></tr>
<tr><td>Pigment dispersion liquid No.</td><td>1</td><td>1</td><td>1</td><td>1</td><td>1</td><td>1</td><td>1</td><td>1</td><td>1</td><td>1</td><td>1</td><td>1</td><td>1</td><td>1</td></tr>
<tr><td>Compound No.</td><td>1</td><td>2</td><td>3</td><td>4</td><td>5</td><td>6</td><td>7</td><td>8</td><td>9</td><td>10</td><td>11</td><td>12</td><td>13</td><td>14</td></tr>
<tr><td>Pigment dispersion liquid C.I. Direct Black 168</td><td>40.00</td><td>40.00</td><td>40.00</td><td>40.00</td><td>40.00</td><td>40.00</td><td>40.00</td><td>40.00</td><td>40.00</td><td>40.00</td><td>40.00</td><td>40.00</td><td>40.00</td><td>40.00</td></tr>
<tr><td>Compound</td><td>0.25</td><td>0.25</td><td>0.25</td><td>0.25</td><td>0.25</td><td>0.25</td><td>0.25</td><td>0.25</td><td>0.25</td><td>0.25</td><td>0.25</td><td>0.25</td><td>0.25</td><td>0.25</td></tr>
<tr><td>Comparative compound 1</td><td></td><td></td><td></td><td></td><td></td><td></td><td></td><td></td><td></td><td></td><td></td><td></td><td></td><td></td></tr>
<tr><td>Comparative compound 2</td><td></td><td></td><td></td><td></td><td></td><td></td><td></td><td></td><td></td><td></td><td></td><td></td><td></td><td></td></tr>
<tr><td>Comparative compound 3</td><td></td><td></td><td></td><td></td><td></td><td></td><td></td><td></td><td></td><td></td><td></td><td></td><td></td><td></td></tr>
<tr><td>Glycerin</td><td>5.00</td><td>5.00</td><td>5.00</td><td>5.00</td><td>5.00</td><td>5.00</td><td>5.00</td><td>5.00</td><td>5.00</td><td>5.00</td><td>5.00</td><td>5.00</td><td>5.00</td><td>5.00</td></tr>
<tr><td>2-Pyrrolidone</td><td>5.00</td><td>5.00</td><td>5.00</td><td>5.00</td><td>5.00</td><td>5.00</td><td>5.00</td><td>5.00</td><td>5.00</td><td>5.00</td><td>5.00</td><td>5.00</td><td>5.00</td><td>5.00</td></tr>
<tr><td>PEG600</td><td>5.00</td><td>5.00</td><td>5.00</td><td>5.00</td><td>5.00</td><td>5.00</td><td>5.00</td><td>5.00</td><td>5.00</td><td>5.00</td><td>5.00</td><td>5.00</td><td>5.00</td><td>5.00</td></tr>
<tr><td>Potassium sulfate</td><td></td><td></td><td></td><td></td><td></td><td></td><td></td><td></td><td></td><td></td><td></td><td></td><td></td><td></td></tr>
<tr><td>Ammonium benzoate</td><td></td><td></td><td></td><td></td><td></td><td></td><td></td><td></td><td></td><td></td><td></td><td></td><td></td><td></td></tr>
<tr><td>Dispersion liquid containing resin fine particle 1</td><td></td><td></td><td></td><td></td><td></td><td></td><td></td><td></td><td></td><td></td><td></td><td></td><td></td><td></td></tr>
<tr><td>ACETYLENOL E100</td><td>0.30</td><td>0.30</td><td>0.30</td><td>0.30</td><td>0.30</td><td>0.30</td><td>0.30</td><td>0.30</td><td>0.30</td><td>0.30</td><td>0.30</td><td>0.30</td><td>0.30</td><td>0.30</td></tr>
<tr><td>Ion-exchanged water</td><td>44.45</td><td>44.45</td><td>44.45</td><td>44.45</td><td>44.45</td><td>44.45</td><td>44.45</td><td>44.45</td><td>44.45</td><td>44.45</td><td>44.45</td><td>44.45</td><td>44.45</td><td>44.45</td></tr>
</table>

TABLE 3-continued

Compositions and characteristics of inks

| | Example | | | | | | | | | | | | |
|---|---|---|---|---|---|---|---|---|---|---|---|---|---|
| | 15 | 16 | 17 | 18 | 19 | 20 | 21 | 22 | 23 | 24 | 25 | 26 | 27 |
| Pigment dispersion liquid No. | 1 | 1 | 1 | 1 | 1 | 2 | 3 | 4 | 5 | 6 | 7 | 8 | 9 |
| Compound No. | 15 | 16 | 17 | 18 | 19 | 2 | 2 | 2 | 2 | 2 | 2 | 2 | 10 |
| Pigment dispersion liquid | 40.00 | 40.00 | 40.00 | 40.00 | 40.00 | 40.00 | 40.00 | 40.00 | 40.00 | 40.00 | 40.00 | 40.00 | 40.00 |
| C.I. Direct Black 168 | | | | | | | | | | | | | |
| Compound | 0.25 | 0.25 | 0.25 | 0.25 | 0.25 | 0.25 | 0.25 | 0.25 | 0.25 | 0.25 | 0.25 | 0.25 | 0.25 |
| Comparative compound 1 | | | | | | | | | | | | | |
| Comparative compound 2 | | | | | | | | | | | | | |
| Comparative compound 3 | | | | | | | | | | | | | |
| Glycerin | 5.00 | 5.00 | 5.00 | 5.00 | 5.00 | 5.00 | 5.00 | 5.00 | 5.00 | 5.00 | 5.00 | 5.00 | 5.00 |
| 2-Pyrrolidone | 5.00 | 5.00 | 5.00 | 5.00 | 5.00 | 5.00 | 5.00 | 5.00 | 5.00 | 5.00 | 5.00 | 5.00 | 5.00 |
| PEG600 | 5.00 | 5.00 | 5.00 | 5.00 | 5.00 | 5.00 | 5.00 | 5.00 | 5.00 | 5.00 | 5.00 | 5.00 | 5.00 |
| Potassium sulfate | | | | | | | | | | | | | |
| Ammonium benzoate | | | | | | | | | | | | | |
| Dispersion liquid containing resin fine particle 1 | | | | | | | | | | | | | |
| ACETYLENOL E100 | 0.30 | 0.30 | 0.30 | 0.30 | 0.30 | 0.30 | 0.30 | 0.30 | 0.30 | 0.30 | 0.30 | 0.30 | 0.30 |
| Ion-exchanged water | 44.45 | 44.45 | 44.45 | 44.45 | 44.45 | 44.45 | 44.45 | 44.45 | 44.45 | 44.45 | 44.45 | 44.45 | 44.45 |

| | Comparative Example | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Pigment dispersion liquid No. | 10 | 11 | 11 | 12 | 13 | 14 | 15 | 16 | 17 | 18 | 19 | 20 | 21 | 22 |
| Compound No. | 2 | 2 | — | 2 | 2 | 2 | 2 | 2 | 2 | 2 | 2 | 2 | 2 | 2 |
| Pigment dispersion liquid | 40.00 | 40.00 | 40.00 | 40.00 | 40.00 | 40.00 | 40.00 | 40.00 | 40.00 | 40.00 | 40.00 | 40.00 | 40.00 | 40.00 |
| C.I. Direct Black 168 | | | | | | | | | | | | | | |
| Compound | 0.25 | 0.25 | | 0.25 | 0.25 | 0.25 | 0.25 | 0.25 | 0.25 | 0.25 | 0.25 | 0.25 | 0.25 | 0.25 |
| Comparative compound 1 | | | | | | | | | | | | | | |
| Comparative compound 2 | | | | | | | | | | | | | | |
| Comparative compound 3 | | | | | | | | | | | | | | |
| Glycerin | 5.00 | 5.00 | 5.00 | 5.00 | 5.00 | 5.00 | 5.00 | 5.00 | 5.00 | 5.00 | 5.00 | 5.00 | 5.00 | 5.00 |
| 2-Pyrrolidone | 5.00 | 5.00 | 5.00 | 5.00 | 5.00 | 5.00 | 5.00 | 5.00 | 5.00 | 5.00 | 5.00 | 5.00 | 5.00 | 5.00 |
| PEG600 | 5.00 | 5.00 | 5.00 | 5.00 | 5.00 | 5.00 | 5.00 | 5.00 | 5.00 | 5.00 | 5.00 | 5.00 | 5.00 | 5.00 |
| Potassium sulfate | | | | | | | | | | | | | | |
| Ammonium benzoate | | | | | | | | | | | | | | |
| Dispersion liquid containing resin fine particle 1 | | | | | | | | | | | | | | |
| ACETYLENOL E100 | 0.30 | 0.30 | 0.30 | 0.30 | 0.30 | 0.30 | 0.30 | 0.30 | 0.30 | 0.30 | 0.30 | 0.30 | 0.30 | 0.30 |
| Ion-exchanged water | 44.45 | 44.45 | 44.70 | 44.45 | 44.45 | 44.45 | 44.45 | 44.45 | 44.45 | 44.45 | 44.45 | 44.45 | 44.45 | 44.45 |

| | Comparative Example | | | | | | | | | | | |
|---|---|---|---|---|---|---|---|---|---|---|---|---|
| | 15 | 16 | 17 | 18 | 19 | 20 | 21 | 22 | 23 | 24 | 25 | 26 |
| Pigment dispersion liquid No. | 1 | 1 | 1 | 1 | 1 | 1 | 19 | 20 | 14 | 15 | 21 | — |
| Compound No. | — | — | — | — | — | — | 10 | 10 | 10 | 10 | 10 | 2 |
| Pigment dispersion liquid | | 40.00 | 40.00 | 40.00 | 40.00 | 40.00 | 40.00 | 40.00 | 40.00 | 40.00 | 40.00 | 40.00 |

TABLE 3-continued

Compositions and characteristics of inks

| | 1 | 2 | 3 | 4 | 5 | 6 | 7 | 8 | 9 | 10 | 11 | 12 |
|---|---|---|---|---|---|---|---|---|---|---|---|---|
| C.I. Direct Black 168 | | | | | | | | | | | | 4.00 |
| Compound | | | | | | | 0.25 | 0.25 | 0.25 | 0.25 | 0.25 | 0.25 |
| Comparative compound 1 | 0.25 | | | | | | | | | | | |
| Comparative compound 2 | | 0.25 | | | | | | | | | | |
| Comparative compound 3 | | | 0.25 | | | | | | | | | |
| Glycerin | 5.00 | 5.00 | 5.00 | 5.00 | 5.00 | 5.00 | 5.00 | 5.00 | 5.00 | 5.00 | 5.00 | 5.00 |
| 2-Pyrrolidone | 5.00 | 5.00 | 5.00 | 5.00 | 5.00 | 5.00 | 5.00 | 5.00 | 5.00 | 5.00 | 5.00 | 5.00 |
| PEG600 | 5.00 | 5.00 | 5.00 | 5.00 | 5.00 | 5.00 | 5.00 | 5.00 | 5.00 | 5.00 | 5.00 | 5.00 |
| Potassium sulfate | | | | | 1.00 | | | | | | | |
| Ammonium benzoate | | | | | | 1.00 | | | | | | |
| Dispersion liquid containing resin fine particle 1 | | | | | | | | | 8.80 | 8.80 | 11.10 | |
| ACETYLENOL E100 | 0.30 | 0.30 | 0.30 | 0.30 | 0.30 | 0.30 | 0.30 | 0.30 | 0.30 | 0.30 | 0.30 | 0.30 |
| Ion-exchanged water | 44.07 | 44.45 | 44.45 | 44.45 | 43.70 | 43.70 | 44.45 | 44.45 | 35.65 | 35.6 | 33.35 | 80.45 |

<Evaluation>

Each of the inks obtained in the foregoing was loaded into an ink cartridge and the ink cartridge was mounted on an ink jet recording apparatus (product name: "PIXUS MX7600"; manufactured by Canon Inc.) configured to eject an ink from a recording head through the action of thermal energy. Recording conditions were set as follows: a temperature of 23° C., a relative humidity of 55%, a recording density of 4,800 dpi×1,200 dpi and an ejection amount per droplet of 5.5 pL. In Examples, the recording duty of a solid image recorded under such conditions that two ink droplets are applied in an amount of 5.5 pL per droplet to a unit region measuring 1/600 inch by 1/600 inch is defined as 100%. In the present invention, in the evaluation criteria of each of the following evaluation items, while levels AA, A and B were defined as acceptable levels, a level C was defined as an unacceptable level. The results of the evaluations are shown in Table 4.

(Color Developability)

A recorded product was obtained by recording an image having a recording duty of 150% on each of the following three kinds of recording media (plain paper) with the ink jet recording apparatus.

PPC paper PB PAPER (manufactured by Canon Inc., pH: 7.0)

PPC paper Oce Recycled Classic (manufactured by Canon Inc., pH: 7.3)

PPC paper Bright White (manufactured by Hewlett-Packard Company, pH: 7.1)

Each of the resultant recorded products was dried in an environment having a temperature of 23° C. and a relative humidity of 55% for 24 hours. After that, the optical density of the solid image was measured with a spectrophotometer (product name: "Spectrolino"; manufactured by Gretag Macbeth) under the conditions of a light source of D50 and a field of view of 2°, followed by the evaluation of the optical densities from the average of the three kinds of recording media in accordance with the following criteria. The solid image for the evaluation of color developability could not be recorded with the ink of Comparative Example 8 because its ejection was unstable.

AAA: The average of the optical densities was 1.5 or more.

AA: The average of the optical densities was 1.4 or more to less than 1.5.

A: The average of the optical densities was 1.3 or more to less than 1.4.

B: The average of the optical densities was 1.2 or more to less than 1.3.

C: The average of the optical densities was less than 1.2.

(Sticking Recovery Property)

The nozzle check pattern of PIXUS MX7600 was recorded on a recording medium (plain paper, PPC paper GF-500, manufactured by Canon Inc.) with the ink jet recording apparatus. After that, the recording head mounted with the ink cartridge (head cartridge) was removed from the ink jet recording apparatus and left to stand in an environment having a temperature of 30° C. and a relative humidity of 10% for 7 days. Then, the head cartridge was mounted on the ink jet recording apparatus again to record the nozzle check pattern. When the nozzle check pattern was not normally recorded and clogging occurred, cleaning was started from a printer driver and then the nozzle check pattern was recorded again. When the clogging occurred even at the time point, the cleaning was started from the printer driver and then powerful cleaning was further performed. After that, the nozzle check pattern was recorded again. When the clogging occurred nevertheless, the powerful cleaning and the recording of the nozzle check pattern were repeated. Thus, a sticking recovery property was evaluated by the number of times of the powerful cleaning needed until the nozzle check pattern could be normally recorded.

A: The nozzle check pattern was normally recorded by performing the powerful cleaning twice.

C: The powerful cleaning needed to be performed three or more times until the nozzle check pattern was normally recorded.

TABLE 4

| | | Evaluation results | |
| --- | --- | --- | --- |
| | | Color developability | Sticking recovery property |
| Example | 1 | AAA | A |
| | 2 | AA | A |
| | 3 | B | A |
| | 4 | AA | A |
| | 5 | AA | A |
| | 6 | B | A |
| | 7 | B | A |
| | 8 | AA | A |
| | 9 | B | A |
| | 10 | B | A |
| | 11 | AA | A |
| | 12 | AA | A |
| | 13 | B | A |
| | 14 | AA | A |
| | 15 | AA | A |
| | 16 | B | A |
| | 17 | AA | A |
| | 18 | B | A |
| | 19 | AA | A |
| | 20 | AA | A |
| | 21 | A | A |
| | 22 | AA | A |
| | 23 | A | A |
| | 24 | B | A |
| | 25 | B | A |
| | 26 | A | A |
| | 27 | B | A |
| Comparative Example | 1 | C | A |
| | 2 | C | A |
| | 3 | C | A |
| | 4 | C | A |
| | 5 | C | A |
| | 6 | C | A |
| | 7 | C | A |
| | 8 | No ejection | C |
| | 9 | C | A |
| | 10 | C | A |
| | 11 | C | A |
| | 12 | C | A |
| | 13 | C | A |
| | 14 | C | A |
| | 15 | C | A |
| | 16 | C | A |
| | 17 | C | A |
| | 18 | C | A |
| | 19 | A | C |
| | 20 | A | C |
| | 21 | C | A |
| | 22 | C | A |
| | 23 | C | A |
| | 24 | C | A |
| | 25 | C | A |
| | 26 | C | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-108897, filed Jun. 1, 2017 and Japanese Patent Application No. 2018-095417, filed May 17, 2018, which are hereby incorporated by reference herein in their entirety.

What is claimed is:

1. An aqueous ink for ink jet comprising:
a pigment; and
a surfactant,
wherein the pigment comprises a self-dispersible pigment in which at least one functional group selected from the group consisting of (i) an anionic group and (ii) a group in which another atomic group and an anionic group are bonded to each other is bonded to a surface of a particle of carbon black and a density of the functional group is 0.10 μmol/m² or more to 0.48 μmol/m² or less and
wherein the surfactant comprises an amino acid type surfactant in which a nitrogen atom capable of becoming a cation has a structure of a secondary amine or a tertiary amine.

2. The aqueous ink according to claim 1, wherein the amino acid type surfactant is represented by the following general formula (1):

(1)

in the general formula (1), $R_1$ represents an alkyl group having 8 to 18 carbon atoms, Z represents $(CO)_p(NH(CH_2)_q)_r$, and p represents an integer of 0 or 1, q represents an integer of 2 or 3 and r represents an integer of from 1 to 3, $R_2$ represents a hydrogen atom or $(CH_2)_s-X_1$ and s represents an integer of from 1 to 3, $R_3$ represents $(CH_2)_t-X_2$ and t represents an integer of from 1 to 3 and $X_1$ and $X_2$ each independently represent a hydrogen atom, a hydroxy group, a carboxylic acid group or a sulfonic acid group, provided that $X_1$ and $X_2$ do not simultaneously represent a combination of hydrogen atoms or a combination of hydroxy groups.

3. The aqueous ink according to claim 2, wherein $R_2$ in the general formula (1) represents a hydrogen atom.

4. The aqueous ink according to claim 2, wherein p in the general formula (1) represents 1.

5. The aqueous ink according to claim 1, wherein the density of the functional group is 0.10 μmol/m² or more to 0.30 μmol/m² or less.

6. The aqueous ink according to claim 1, wherein the anionic group of the self-dispersible pigment comprises a carboxylic acid group.

7. The aqueous ink according to claim 1, wherein the functional group of the self-dispersible pigment comprises a group in which two or more carboxylic acid groups are bonded to another atomic group.

8. An ink cartridge comprising:
an ink; and
an ink storage portion configured to store the ink,
wherein the ink comprises the aqueous ink of claim 1.

9. An ink jet recording method comprising ejecting an ink from a recording head of an ink jet system to record an image on a recording medium,
wherein the ink comprises the aqueous ink of claim 1.

* * * * *